United States Patent
Lee et al.

(10) Patent No.: US 8,420,274 B2
(45) Date of Patent: Apr. 16, 2013

(54) MEMBRANE ELECTRODE ASSEMBLY FOR FUEL CELL, METHOD OF MANUFACTURING THE SAME, AND FUEL CELL INCLUDING THE MEMBRANE ELECTRODE ASSEMBLY

(75) Inventors: Yoonhoi Lee, Seoul (KR); Daejong Yoo, Hwaseong-si (KR); Chanho Pak, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1084 days.

(21) Appl. No.: 12/338,046

(22) Filed: Dec. 18, 2008

(65) Prior Publication Data
US 2009/0197137 A1    Aug. 6, 2009

(30) Foreign Application Priority Data
Feb. 5, 2008 (KR) .......................... 10-2008-0011917

(51) Int. Cl.
*H01M 8/10* (2006.01)

(52) U.S. Cl.
USPC .......................................... 429/483; 429/480

(58) Field of Classification Search ........................ None
See application file for complete search history.

(56) References Cited

U.S. PATENT DOCUMENTS

| 8,007,957 B2* | 8/2011 | Kim et al. ..................... 429/523 |
| 2005/0271929 A1* | 12/2005 | Sompalli et al. ................ 429/40 |
| 2008/0176112 A1* | 7/2008 | Lu et al. .......................... 429/13 |
| 2008/0299430 A1* | 12/2008 | Ichikawa et al. ................ 429/30 |

* cited by examiner

*Primary Examiner* — Melvin C Mayes
*Assistant Examiner* — Sheng H Davis
(74) *Attorney, Agent, or Firm* — Lee & Morse, P.C.

(57) ABSTRACT

A membrane electrode assembly for a fuel cell, includes: an electrolyte membrane, and cathode and anode that are respectively disposed on opposing surfaces of the electrolyte membrane, wherein the anode comprises an anode catalyst layer, an anode micro-porous layer and an anode diffusion support that are sequentially disposed on one surface of the electrolyte membrane, wherein the thickness ratio of the anode catalyst layer to the anode micro-porous layer is in a range of 1:0.82 to 1:3.28, and the thickness ratio of the anode catalyst layer to the anode diffusion support is in a range of 1:5 to 1:7.05.

12 Claims, 3 Drawing Sheets

MEMBRANE ELECTRODE ASSEMBLY FOR FUEL CELL, METHOD OF MANUFACTURING THE SAME, AND FUEL CELL INCLUDING THE MEMBRANE ELECTRODE ASSEMBLY

CROSS-REFERENCE TO RELATED APPLICATIONS

This application claims the benefit of Korean Patent Application No. 2008-11917, filed on Feb. 5, 2008, in the Korean Intellectual Property Office, the disclosure of which is incorporated herein by reference.

BACKGROUND OF THE INVENTION

1. Field of the Invention

Aspects of the present invention relate to a membrane electrode assembly for a fuel cell, a method of manufacturing the same, and a fuel cell including the membrane electrode assembly.

2. Description of the Related Art

Fuel cells are devices in which a fuel and oxygen react electrochemically to generate electricity. Compared to other fuel cells, polymer electrolyte membrane fuel cells (PEMFCs) have a low operating temperature, high efficiency, high current density, high power density, short starting time, and a rapid response speed in response to a load change. In addition, since the PEMFCs use a polymer membrane as an electrolyte, the PEMFCs do not corrode, there is no need for electrolyte adjustment, the design of the PEMFCs is simple, and thus, the manufacture of the PEMFCs is easy. The PEMFCs have lower volume and weight compared to phosphoric acid type fuel cells that operate in the same manner as the PEMFCs.

When compared with secondary batteries used as power sources for electric vehicles, the PEMFCs have an energy density of about 200 to several thousands Wh/kg, while secondary batteries have an energy density of about 200 Wh/kg or less. In addition, in terms of a charging time, lithium secondary batteries require a charging time of about three hours, whereas the PEMFCs require a fuel injection time of merely several seconds. Thus, research and development of PEMFCs have been actively conducted worldwide in order to use them as power sources for electric vehicles, mobile and emergency power supplies, power supplies for military applications, and the like.

A conventional PEMFC includes a membrane electrode assembly (MEA) including an electrolyte membrane, an electrode catalyst layer, and a fuel diffusion electrode for uniformly diffusing fuels.

In direct methanol fuel cells (DMFCs), generally, when methanol and oxygen are supplied as a fuel, a methanol oxidation reaction and an oxygen reduction reaction occur in a catalyst layer, and thus, electrons move and carbon dioxide and water are generated as byproducts.

In order to enhance the performance of the DMFCs, it is important that a gas diffusion layer (GDL) has a structure such that fuel, i.e., an aqueous methanol solution, is uniformly diffused into an electrode catalyst layer, resulting in the occurrence of an active reaction, and carbon dioxide gases as a byproduct generated by the reaction are satisfactorily exhausted to outside of the electrode. However, since the aqueous methanol solution is hydrophilic and the carbon dioxide gases are hydrophobic, it is very difficult to construct the GDL such that inflow of fuel and discharge of byproducts are efficiently performed.

The MPL (micro-porous layer) is formed to coat the slurries prepared by mixing a water-repellent polymer resin and carbon into the carbon paper, and then drying and heat-treating the resultant. The hydrophilic and hydrophobic properties of the MPL are adjusted by controlling the amounts of the water-repellent polymer resin and carbon or by adding a surfactant thereto.

In addition, as a method of reducing the contact resistance between the electrode catalyst layer and the GDL, a method of compressing an MEA at a certain pressure has been disclosed (US Patent Publication 2003/0134178 A1). However, there is still a need for improvement in order to achieve a satisfactory reaction efficiency of a fuel cell including such GDL. The structure and adhesion state of the GDL of a fuel cell is largely dependent of the supply and exhaust of fuel, and the states of the electrode catalyst layer related to proton ion conductivity.

SUMMARY OF THE INVENTION

Aspects of the present invention provide a membrane electrode assembly for a fuel cell in which the reaction efficiency of fuel is improved, a method of manufacturing the same, and a fuel cell including the membrane electrode assembly.

According to an aspect of the present invention, there is provided a membrane electrode assembly for a fuel cell, comprising: an electrolyte membrane, and a cathode and an anode that are respectively disposed on opposing surfaces of the electrolyte membrane, wherein the anode comprises an anode catalyst layer, an anode micro-porous layer, and an anode diffusion support that are sequentially disposed on one of the opposing surfaces of the electrolyte membrane, wherein the thickness ratio of the anode catalyst layer to the anode micro-porous layer is in a range of 1:0.82 to 1:3.28, and the thickness ratio of the anode catalyst layer to the anode diffusion support is in a range of 1:5 to 1:7.05.

The anode micro-porous layer may comprise a carbon-based material and a fluorine-based polymer, wherein the loading amount of the carbon-based material is in a range of 0.8 to 2.7 $mg/cm^2$, and the amount of the fluorine-based polymer is in a range of 3 to 17 parts by weight based on 100 parts by weight of the carbon-based material.

When the thickness ratio of the anode catalyst layer to the anode micro-porous layer is in a range of 1:0.82 to 1:0.88, the anode micro-porous layer may comprise a carbon-based material and a fluorine-based polymer, the loading amount of the carbon-based material may be in a range of 0.8 to 1.2 $mg/cm^2$, the amount of the fluorine-based polymer may be in a range of 13 to 17 parts by weight based on 100 parts by weight of the carbon, and the thickness ratio of the anode catalyst layer to the anode diffusion support may be in a range of 1:6.4 to 1:6.9.

When the thickness ratio of the anode catalyst layer to the anode micro-porous layer is in a range of 1:1.67 to 1:1.73, the anode micro-porous layer may comprise a carbon-based material and a fluorine-based polymer, the loading amount of the carbon-based material may be in a range of 1.3 to 1.7 $mg/cm^2$, the amount of the fluorine-based polymer may be in a range of 8 to 12 parts by weight based on 100 parts by weight of the carbon, and the thickness ratio of the anode catalyst layer to the anode diffusion support may be in a range of 1:6.65 to 1:7.05.

When the thickness ratio of the anode catalyst layer to the anode micro-porous layer is in a range of 1:3.22 to 1:3.28, the anode micro-porous layer may comprise a carbon-based material and a fluorine-based polymer, the loading amount of the carbon-based material may be in a range of 2.3 to 2.7 mg/cm², the amount of the fluorine-based polymer may be in a range of 3 to 7 parts by weight based on 100 parts by weight of the carbon, and the thickness ratio of the anode catalyst layer to the anode diffusion support may be in a range of 1:5 to 1:5.5.

According to another aspect of the present invention, there is provided a method of manufacturing a membrane electrode assembly, comprising: preparing a cathode gas diffusion layer by coating a mixture comprising a carbon-based material, a fluorine-based polymer, and a solvent on a cathode diffusion support and heat-treating the resultant to form a cathode micro-porous layer; preparing an anode gas diffusion layer by coating a mixture comprising a carbon-based material, a fluorine-based polymer, and a solvent on an anode diffusion support and heat-treating the resultant to form an anode micro-porous layer; preparing an electrode catalyst coated electrolyte membrane in which a cathode catalyst layer and an anode catalyst layer are respectively assembled on opposing sides of the electrolyte membrane; respectively disposing the cathode micro-porous layer of the cathode gas diffusion layer and the anode micro-porous layer of the anode gas diffusion layer adjacent to the cathode catalyst layer and the anode catalyst layer of the electrode catalyst coated electrolyte membrane, and installing gaskets on both ends of each of the cathode and the anode to form a membrane electrode assembly; and compressing the membrane electrode assembly such that a thickness ratio of the anode catalyst layer to the anode micro-porous layer is in a range of 1:0.82 to 1:3.28, and a thickness ratio of the anode catalyst layer to the anode diffusion support is in a range of 1:5 to 1:7.05.

According to another aspect of the present invention, there is provided a fuel cell comprising the membrane electrode assembly for a fuel cell.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
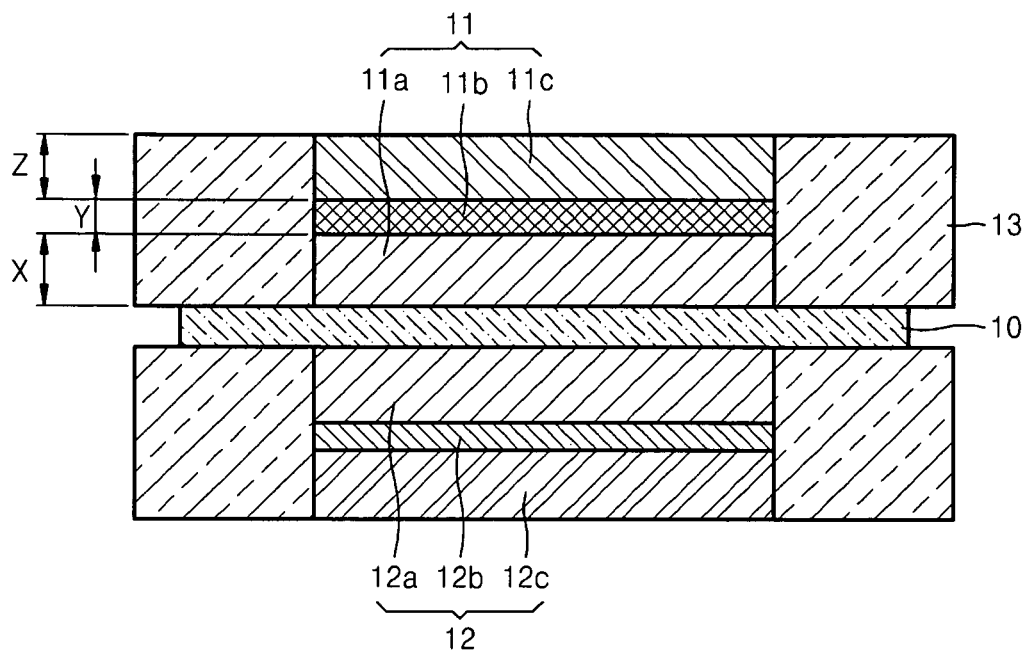
FIG. 1 is a diagram illustrating a laminated structure of a membrane electrode assembly (MEA) for a fuel cell, according to an embodiment of the present invention.

Reference will now be made in detail to the present embodiments, examples of which are illustrated in the accompanying drawings, wherein like reference numerals refer to the like elements throughout. The embodiments are described below in order to explain the present invention by referring to the figures. In the drawings, the thicknesses of layers, films, membranes, regions, etc., are exaggerated for clarity. It will be understood that when an element such as a layer, film, region, or substrate is referred to as being "on" or "disposed on" another element, it can be directly on the other element or intervening elements may also be present. In contrast, when an element is referred to as being "directly on" another element, there are no intervening elements present.

Aspects of the present invention provide a membrane electrode assembly for a fuel cell to improve the efficiency of fuel diffusion by both controlling the thickness ratio of an anode electrode, which comprises an anode catalyst layer, an anode micro-porous layer (MPL), and an anode diffusion support and by controlling the morphology of the MPL, and thus the contact resistance between the anode MPL and the anode catalyst layer decreases and the proton conductivity of the anode is improved.

The thickness ratio of the anode catalyst layer to the anode MPL may be preferably in a range of 1:0.82 to 1:3.28, and more preferably, in a range of 1:0.85 to 1:3.25. In addition, the thickness ratio of the anode catalyst layer to the anode diffusion support may be preferably in a range of 1:5 to 1:7.05, and more preferably, in a range of 1:5.25 to 1:65. When the thickness ratio of the anode catalyst layer to the anode MPL is greater than 1:3.28, the anode MPL is thick, and thus diffusion of a liquid fuel is slow, resulting in poor performance of the membrane electrode assembly. When the thickness ratio of the anode catalyst layer to the anode MPL is less than 1:0.82, the anode MPL is thin, and thus the diffusion of the liquid fuel is not uniform, resulting in poor performance of the membrane electrode assembly.

When the thickness ratio of the anode catalyst layer to the anode diffusion support is greater than 1:7.05, the contact resistance between the anode catalyst layer and the anode diffusion support is high, resulting in poor performance of the membrane electrode assembly. When the thickness ratio of the anode catalyst layer to the anode diffusion support is less than 1:5, physical binding between the anode catalyst layer and the anode diffusion layer increases, and thus the resistance to proton transfer is significantly increased, resulting in poor performance of the membrane electrode assembly.

The thickness of the anode catalyst layer of the anode may be in a range of 17 to 23 μm. The thickness of the anode MPL may be in a range of 10 to 70 μm. The thickness of the anode diffusion support may be in a range of 60 to 200 μm.

When the thickness ratio of the anode catalyst layer to the anode MPL is in a range of 1:3.22 to 1:3.28, and preferably 1:3.25, the loading (or doping) amount of carbon may be in a range of 2.3 to 2.7 mg/cm², and the amount of a fluorine-based polymer may be in a range of 3 to 7 parts by weight based on 100 parts by weight of the carbon. Herein, the thickness ratio of the anode catalyst to the anode diffusion support may be in a range of 1:5 to 1:5.5, and preferably 1:5.25.

When the thickness ratio of the anode catalyst layer to the anode MPL is in a range of 1:1.67 to 1:1.73, and preferably about 1:1.7, the loading amount of carbon may be in a range of 1.3 to 1.7 mg/cm², and the amount of a fluorine-based polymer may be in a range of 8 to 12 parts by weight based on 100 parts by weight of the carbon. Herein, the thickness ratio of the anode catalyst to the anode diffusion support may be in a range of 1:6.65 to 1:7.05, and preferably 1:6.8.

When the thickness ratio of the anode catalyst layer to the anode MPL is in a range of 1:0.82 to 1:0.88, and preferably about 1:0.85, the loading amount of carbon may be in a range of 0.8 to 1.2 mg/cm², and the amount of a fluorine-based polymer may be in a range of 13 to 17 parts by weight based on 100 parts by weight of the carbon. Herein, the thickness ratio of the anode catalyst to the anode diffusion support may be in a range of 1:6.4 to 1:6.9, and preferably 1:6.65.

The fluorine-based polymer used when the MPL is formed, which provides hydrophobicity, may be one selected from the group consisting of polytetrafluoroethylene, a tetrafluoroethylene-perfluoroalkylvinylether copolymer, a tetrafluoroethylene-hexafluoropropylene copolymer, and a tetrafluoroethylene-ethylene copolymer, and combinations thereof.

A carbon-based material used when the anode MPL is formed may be one selected from the group consisting of active carbon powder, active carbon fiber, carbon black, carbon aerosol, carbon nanotubes, carbon nanofibers, carbon nanohorn powder, natural graphite powder, and synthetic graphite powder, and combinations thereof.

FIG. 1 is a diagram illustrating a laminated structure of a membrane electrode assembly (MEA) for a fuel cell, according to an embodiment of the present invention. Referring to FIG. 1, the membrane electrode assembly includes an electrolyte membrane 10, an anode 11 formed on a surface of the electrolyte membrane 10, and a cathode 12 formed on the other surface of the electrolyte membrane 10, i.e., a surface of the electrolyte membrane 10 opposite the anode 11. As shown in FIG. 1, the anode 11 includes an anode catalyst layer 11$a$, an anode micro-porous layer (MPL) 11$b$, and an anode diffusion support 11$c$. Herein, the anode catalyst layer 11$a$ is formed adjacent to the electrolyte membrane 10.

The cathode 12 includes a cathode catalyst layer 12$a$ formed adjacent to the other surface of the electrolyte membrane 10, and a cathode micro-porous layer (MPL) 12$b$ and a cathode diffusion support 12$c$ that are sequentially formed on the cathode catalyst layer 12$a$. As shown in FIG. 1, gaskets 13 are disposed on both sides of the electrolyte membrane 10 about each of the cathode 12 and the anode 11. Aspects of the present invention are not limited thereto such that the gaskets 13 may be disposed on both ends of each of the cathode 12 and the anode 11.

The thickness ratios among the anode diffusion support 11$c$, the anode MPL 11$b$, and the anode catalyst layer 11$a$ are determined so that diffusion of a liquid fuel is uniform. In FIG. 1, X is the thickness of the anode catalyst layer 11$a$, Y is the thickness of the anode MPL 11$b$, and Z is the thickness of the anode diffusion support 11$c$.

The thickness ratio of the anode catalyst layer 11$a$ to the anode MPL 11$b$ is in a range of 1:0.82 to 1:3.28. The thickness ratio of the anode catalyst layer 11$a$ to the anode diffusion support 11$c$ is in a range of 1:5 to 1:7.05.

According to an embodiment of the present invention, when the thickness ratio of the anode catalyst layer 11$a$ to the anode MPL 11$b$ is 1:3.25, the loading amount of carbon is in a range of 2.3 to 2.7 mg/cm$^2$, and the amount of the fluorine-based polymer may be in a range of 3 to 7 parts by weight based on 100 parts by weight of the carbon-based material. Herein, the thickness ratio of the anode catalyst layer 11$a$ to the anode diffusion support 11$c$ may be 1:5.25.

According to another embodiment of the present invention, when the thickness ratio of the anode catalyst layer 11$a$ to the anode MPL 11$b$ is about 1:1.7, the loading amount of carbon may be in a range of 1.3 to 1.7 mg/cm$^2$, and the amount of the fluorine-based polymer may be in a range of 8 to 12 parts by weight based on 100 parts by weight of the carbon-based material. Herein, the thickness ratio of the anode catalyst layer 11$a$ to the anode diffusion support 11$c$ may be 1:6.8.

According to another embodiment of the present invention, when the thickness ratio of the anode catalyst layer 11$a$ to the anode MPL 11$b$ is about 1:0.85, the loading amount of carbon may be in a range of 0.8 to 1.2 mg/cm$^2$, and the amount of the fluorine-based polymer may be in a range of 13 to 17 parts by weight based on 100 parts by weight of the carbon-based material. Herein, the thickness ratio of the anode catalyst layer 11$a$ to the anode diffusion support 11$c$ may be 1:6.65.

The morphology of the anode MPL 11$a$ is the amounts of the carbon-based material and the fluorine-based polymer to change the compression ratio of the MEA, and thus the contact resistance between the anode MPL 11$b$ and the anode catalyst layer 11$a$ is decreased, thereby resulting in uniform and effective diffusion of the liquid fuel. As a result, the proton conductivity characteristics of the anode 11 are improved.

Hereinafter, a method of manufacturing the MEA according to aspects of the present invention will be described. First, a carbon-based material, a solvent, and a fluorine-based polymer are mixed together to prepare a composition for forming an anode MPL.

The amount of the fluorine-based polymer may be in a range of 3 to 17 parts by weight based on 100 parts by weight of the carbon-based material. The solvent may be at least one selected from the group consisting of isopropyl alcohol, water, ethanol, and methanol, and combinations thereof. The amount of the solvent may be in a range of 150 to 200 parts by weight based on 100 parts by weight of the carbon-based material.

Next, the composition for forming the anode MPL is coated on an anode diffusion support and heat-treated to form the anode MPL. As a result, the manufacture of an anode gas diffusion layer is completed. The coating method is not particularly limited, and for example, may be spin coating, dip coating, screen coating, or the like.

The heat-treatment may be performed at a temperature in a range of 320 to 350° C. When the temperature of the heat-treatment is less than 320° C., the fluorine-based polymer is not uniform in the anode gas diffusion layer. When the temperature of the heat-treatment is greater than 350° C., the fluorine-based polymer is thermally decomposed.

A cathode gas diffusion layer is prepared in the same manner as in the preparation of the anode gas diffusion layer described above.

An electrode catalyst layer coated electrolyte membrane including an electrolyte membrane and cathode and anode catalyst layers formed on both sides of the electrolyte membrane is formed.

Next, the anode MPL of the anode gas diffusion layer and the cathode MPL of the cathode gas diffusion layer are respectively positioned adjacent to the anode and cathode catalyst layers of the electrode catalyst layer coated electrolyte membrane, gaskets are installed on both sides of the electrolyte membrane about each of the anode and cathode gas diffusion layer, and then the resultant is compressed. Aspects of the present invention are not limited thereto such that the gaskets may be disposed on both ends of each of the cathode and the anode. The compressing may be performed at a temperature in a range of 110 to 130° C., and preferably in a range of 115 to 125° C., at a pressure in a range of 0.1 to 0.2 ton/cm$^2$ for 3 to 5 minutes.

The anode and cathode MPLs prepared in the processes described above include 0.8 to 2.7 mg/cm$^2$ of a carbon-based material and a fluorine-based polymer having an amount of 3 to 17 parts by weight based on 100 parts by weight of the carbon-based material. In addition, the compression ratio (explained with respect to FIG. 2 below) of the membrane electrode assembly may be in a range of 64 to 78%.

Diffusion of fuels, the contact resistance between the anode catalyst layer and the anode MPL or between the cathode catalyst layer and the cathode MPL, and resistances to proton ion transfer of a catalyst coated membrane (CCM) vary depending on the amounts of the fluorine-based polymer and carbon-based material in the anode and cathode MPL. Accordingly, the compression ratio of the MEA may also be appropriately adjusted.

When the loading amount of the carbon-based material included in the anode MPL is in a range of 2.3 to 2.7 mg/cm$^2$, the amount of the fluorine-based polymer may be in a range of 3 to 7 parts by weight based on 100 parts by weight of the carbon-based material. Herein, the compression ratio of the MEA may be in a range of 73 to 78%.

When the loading amount of the carbon-based material included in the anode MPL is in a range of 1.3 to 1.7 mg/cm$^2$, the amount of the fluorine-based polymer may be in a range of 8 to 12 parts by weight based on 100 parts by weight of the carbon-based material. Herein, the compression ratio of the MEA may be in a range of 73 to 78%.

When the loading amount of the carbon-based material included in the anode MPL is in a range of 0.8 to 1.2 mg/cm$^2$, the amount of the fluorine-based polymer may be in a range of 13 to 17 parts by weight based on 100 parts by weight of the carbon-based material. Herein, the compression ratio of the MEA may be in a range of 64 to 70%.

Figure 2:
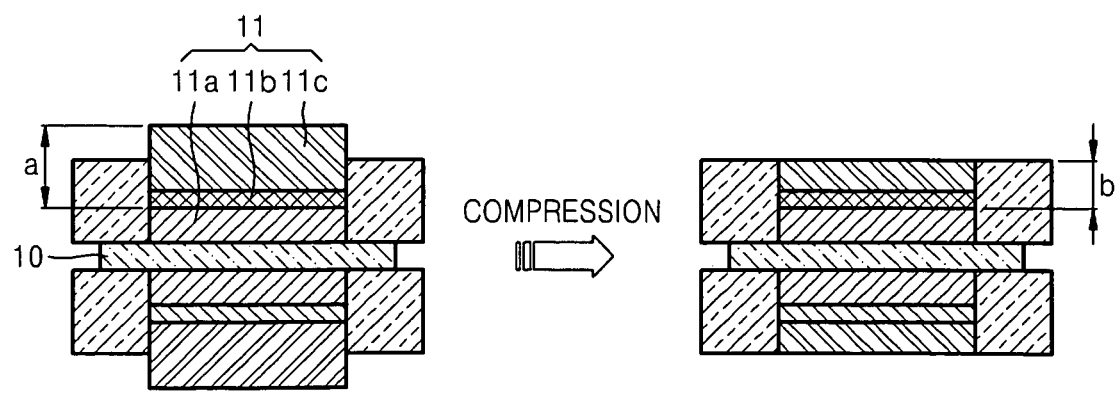
FIG. 2 is a diagram illustrating a compression ratio of a MEA according to an embodiment of the present invention.

FIG. 2 is a diagram for explaining a compression ratio of the MEA manufactured by the process describe above, according to an embodiment of the present invention. Referring to FIG. 2, the compression ratio of the MEA is defined as the ratio of the thickness b of the gas diffusion layer after the compression of the MEA to the thickness a of the gas diffusion layer including the anode MPL 11$b$ and the anode diffusion support 11$c$ before the compression of the MEA (Equation 1).

Compression ratio of MEA (%)=($b/a$)×100  <Equation 1>

Aspects of the present invention will now be described in further detail with reference to the following examples. These examples are for illustrative purposes only and are not intended to limit the scope of the present invention.

Example 1

2.5 mg/cm$^2$ of carbon (Vulcan XC-72R, S$_E$=250 m$^2$/g) and PTFE having an amount of 5 parts by weight based on 100 parts by weight of the carbon were coated on carbon paper (Toray-060 plain), and then the resultant was cut to a size of 3.2×3.2 cm to manufacture a gas diffusion electrode for an anode. SGL-25BC (SGL-Carbon Company, Korea) was used as a gas diffusion electrode for a cathode.

The MPLs of the gas diffusion electrode for a cathode and the gas diffusion electrode for an anode were respectively positioned adjacent to a cathode catalyst layer and an anode catalyst layer of an electrode catalyst coated membrane (CCM). Then, a Teflon gasket having a thickness of 190 μm was installed on both ends of the anode, and a Teflon gasket having a thickness of 170 μm was installed on both ends of the cathode. The resultant was thermally compressed at 125° C. at 0.1 ton/cm$^2$ to manufacture a MEA having a compression ratio of 75.6%. In addition, a fuel cell employing the MEA was manufactured.

While 1 M of methanol was supplied to the fuel cell, performances of the fuel cell were measured at 60° C. at a constant voltage of 0.45 V.

The electrode CCM was prepared as follows. 0.3 g of MgSO$_4$ and 0.8 g of water were added to a 20 ml reactor to completely dissolve the MgSO$_4$. Then, 2 g of PtRu-black was added to the mixture. 1.25 g of 20 wt % Nafion solution and 4 g of ethylene glycol (EG) were added to the mixture and mixed in a high-speed rotating mixer for 3 minutes to prepare a slurry for forming an anode. The mixing was performed three times to make the slurry uniform.

A proton conductive membrane was placed on a vacuum plate in a bar-coater equipped with a vacuum device, and then a polyethylene film (thickness: 110 μm) as a mask for patterning an anode catalyst layer was covered on a predetermined region of the top surface of the proton conductive membrane. The slurry for forming an anode catalyst layer, prepared in the above process, was poured on the resultant at two time intervals, and then when the bar-coater was slowly moved, a uniform anode catalyst layer was formed on the proton conductive membrane covered by the mask. The prepared resultant was dried in a vacuum oven at 120° C. for 24 hours to directly coat the anode catalyst layer on the proton conductive membrane.

Separately, a slurry for forming a cathode was prepared as follows. 0.4 g of MgSO$_4$ and 1 g of water were added to a 20 ml reactor to completely dissolve the MgSO$_4$. Then, 2 g of Pt-black was added to the mixture. 1.25 g of 20 wt % Nafion solution and 3 g of ethylene glycol (EG) were added to the mixture and mixed in a high-speed rotating mixer for 3 minutes to prepare slurries for forming a cathode. The mixing was performed three times to make the slurry uniform.

The prepared slurry for forming a cathode was directly coated on a surface of the proton conductive membrane, opposite to the surface on which the anode catalyst layer was coated, in the same manner as in the process described above.

PTFE films were positioned on both surfaces of the prepared CCM, the CCM was hot-pressed at 150° C. and 0.2 ton/cm$^2$ for 10 minutes, and then the film was peeled off.

Next, the resultant was refluxed using a mixed solution of 500 g of a 1M aqueous solution of sulfuric acid and 500 g of a 1M aqueous solution of methanol at 95° C. for 4 hours to pre-treat the CCM.

Example 2

A fuel cell was manufactured in the same manner as in Example 1, except that when the gas diffusion electrode for an anode was manufactured, the amount of the carbon was 1.0 mg/cm$^2$, the amount of PTFE was 15 parts by weight based on 100 parts by weight of the carbon, a Teflon gasket having a thickness of 170 μm was installed on both ends of the anode, and a Teflon gasket having a thickness of 170 μm was installed on both ends of the cathode. The MEA was compressed to a compression ratio of 66.7%.

Example 3

A fuel cell was manufactured in the same manner as in Example 1, except that when the gas diffusion electrode for an anode was manufactured, the amount of the carbon was 1.5 mg/cm$^2$, the amount of PTFE was 10 parts by weight based on 100 parts by weight of the carbon, a Teflon gasket having a thickness of 190 μm was installed on both ends of the anode, and a Teflon gasket having a thickness of 170 μm was installed on both ends of the cathode. The MEA was compressed to a compression ratio of 75.6%.

Comparative Example 1

A fuel cell was manufactured in the same manner as in Example 1, except that when the gas diffusion electrode for an anode was manufactured, the amount of the carbon was 2.5 mg/cm$^2$, the amount of PTFE was 5 parts by weight based on 100 parts by weight of the carbon, a Teflon gasket having a thickness of 170 μm was installed on both ends of the anode, and a Teflon gasket having a thickness of 170 μm was installed on both ends of the cathode. The MEA was compressed to a compression ratio of 66.7%.

Comparative Example 2

A fuel cell was manufactured in the same manner as in Example 1, except that when the gas diffusion electrode for an anode was manufactured, the amount of the carbon was 1 mg/cm$^2$, the amount of PTFE was 15 parts by weight based on 100 parts by weight of the carbon, a Teflon gasket having a thickness of 190 μm was installed on both ends of the anode, and a Teflon gasket having a thickness of 170 μm was installed on both ends of the cathode. The MEA was compressed to a compression ratio of 75.6%.

Comparative Example 3

A fuel cell was manufactured in the same manner as in Example 1, except that when the gas diffusion electrode for an anode was manufactured, the amount of the carbon was 1.5 mg/cm$^2$, the amount of PTFE was 10 parts by weight based on 100 parts by weight of the carbon, a Teflon gasket having a thickness of 170 μm was installed on both ends of the anode, and a Teflon gasket having a thickness of 170 μm was installed on both ends of the cathode. The MEA was compressed to a compression ratio of 66.7%.

The power density of each of the fuel cells manufactured in Examples 1, 2, and 3 and Comparative Examples 1, 2, and 3 was measured. The results are shown in Table 1 below.

TABLE 1

|  | Thickness (μm) | | | | Power density (mW/cm$^2$) |
| --- | --- | --- | --- | --- | --- |
|  | anode catalyst layer (X) | anode MPL (Y) | Anode carbon paper (Z) | Thickness ratio (X:Y:Z) |  |
| Example 1 | 20 | 65 | 105 | 1:3.25:5.25 | 121.4 |
| Comparative Example 1 | 20 | 65 | 85 | 1:3.25:4.25 | 96.7 |
| Example 2 | 20 | 17 | 133 | 1:0.85:6.65 | 107.4 |
| Comparative Example 2 | 20 | 17 | 153 | 1:0.85:7.65 | 77.9 |
| Example 3 | 20 | 34 | 136 | 1:1.7:6.8 | 105.8 |
| Comparative Example 3 | 20 | 34 | 156 | 1:1.7:7.8 | 76.1 |

Referring to Table 1, the fuel cells of Examples 1 through 3 respectively had improved power density characteristics compared with the fuel cells of Comparative Examples 1 through 3.

Figure 3:
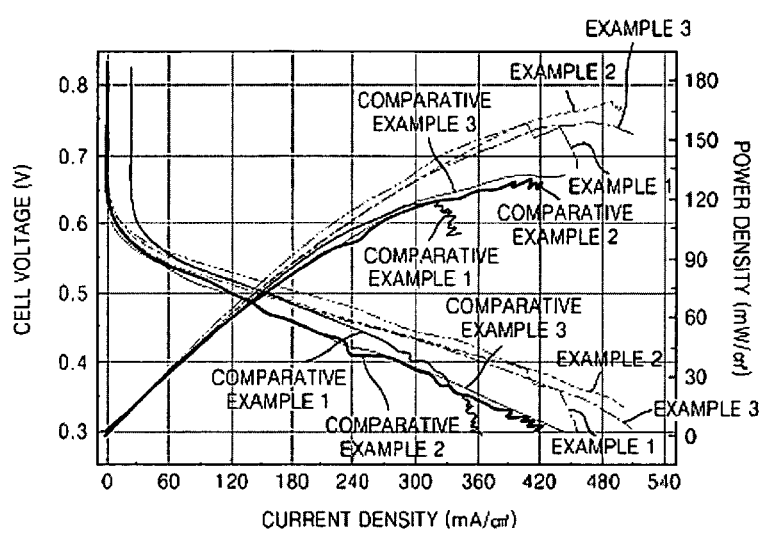
FIG. 3 is a graph showing cell voltage characteristics and power density characteristics according to current density of each of the fuel cells manufactured in Examples 1 through 3 and Comparative Examples 1 through 3.

In addition, cell voltage characteristics and power density characteristics according to current density of the fuel cells of Examples 1 through 3 and Comparative Examples 1 through 3 were measured. The results are shown in FIG. 3. Referring to FIG. 3, the fuel cells of Examples 1 through 3 had improved cell voltage and power density characteristics compared with the fuel cells of Comparative Example 1 through 3.

Figure 4:
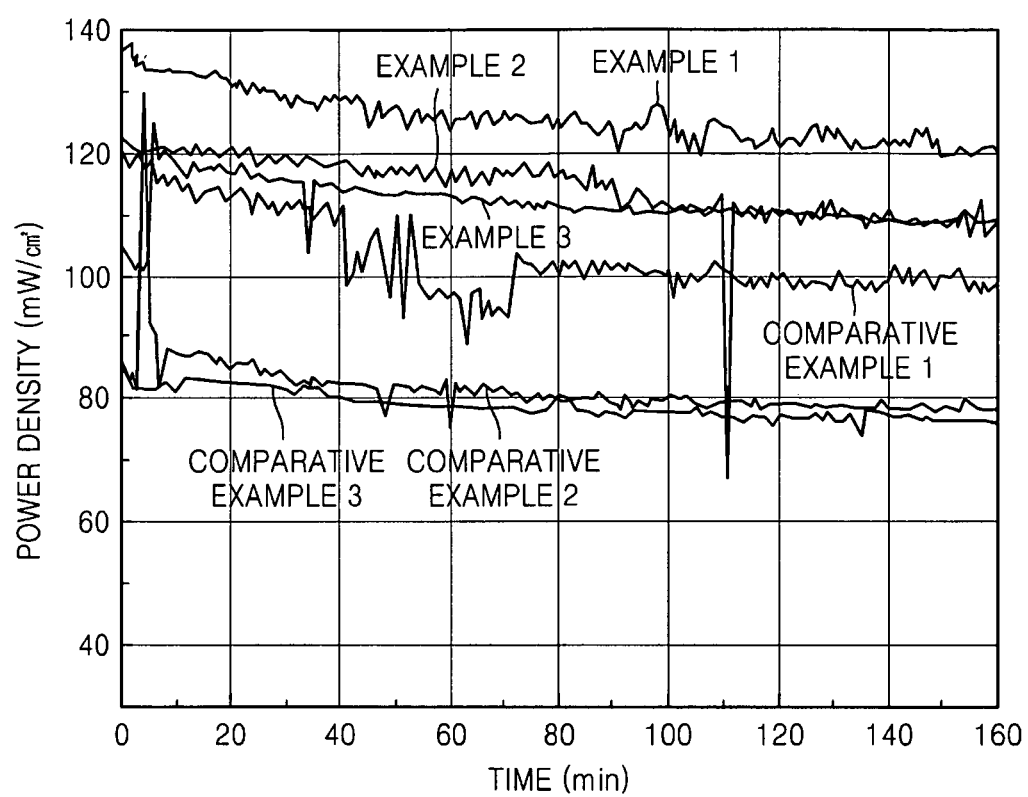
FIG. 4 is a graph showing power density characteristics versus time of each of the fuel cells manufactured in Examples 1 through 3 and Comparative Examples 1 through 3.

The power density versus time of each of the fuel cells of Examples 1, 2, and 3 and Comparative Examples 1, 2, and 3 was measured. The results are shown in FIG. 4. As shown in FIG. 4, the fuel cells of Examples 1, 2, and 3 had improved power density characteristics compared with the fuel cells of Comparative Examples 1, 2, and 3.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A membrane electrode assembly for a fuel cell, comprising:
    an electrolyte membrane; and
    a cathode and an anode respectively disposed on opposing surfaces of the electrolyte membrane,
    wherein the anode includes:
        an anode catalyst layer, an anode micro-porous layer, and an anode diffusion support that are sequentially disposed on one of the opposing surfaces of the electrolyte membrane,
        wherein a thickness ratio of the anode catalyst layer to the anode micro-porous layer is in a range of 1:0.82 to 1:3.28, and a thickness ratio of the anode catalyst layer to the anode diffusion support is in a range of 1:5 to 1:7.05.

2. The membrane electrode assembly of claim 1, wherein the anode micro-porous layer comprises:
    a carbon-based material, and
    a fluorine-based polymer,
    wherein a loading amount of the carbon-based material is in a range of 0.8 to 2.7 mg/cm$^2$, and an amount of the fluorine-based polymer is in a range of 3 to 17 parts by weight based on 100 parts by weight of the carbon-based material.

3. The membrane electrode assembly of claim 2, wherein the fluorine-based polymer includes at least one selected from polytetrafluoroethylene, a tetrafluoroethylene-perfluoroalkylvinylether copolymer, a tetrafluoroethylene-hexafluoropropylene copolymer, and a tetrafluoroethylene-ethylene copolymer.

4. The membrane electrode assembly of claim 2, wherein the carbon-based material includes at least one of active carbon powder, active carbon fiber, carbon black, carbon aerosol, carbon nanotubes, carbon nanofibers, carbon nanohorn powder, natural graphite powder, and synthetic graphite powder.

5. The membrane electrode assembly of claim 2, wherein the fluorine-based polymer includes at least one selected from a tetrafluoroethylene-perfluoroalkylvinylether copolymer, a tetrafluoroethylene-hexafluoropropylene copolymer, and a tetrafluoroethylene-ethylene copolymer.

6. The membrane electrode assembly of claim 1, wherein:
    the thickness ratio of the anode catalyst layer to the anode micro-porous layer is in a range of 1:0.82 to 1:0.88,
    the anode micro-porous layer includes:
        a carbon-based material, and
        a fluorine-based polymer, a loading amount of the carbon-based material is in a range of 0.8 to 1.2 mg/cm$^2$, and an amount of the fluorine-based polymer is in a range of 13 to 17 parts by weight based on 100 parts by weight of the carbon-based material.

7. The membrane electrode assembly of claim 6, wherein the thickness ratio of the anode catalyst layer to the anode diffusion support is in a range of 1:6.4 to 1:6.9.

8. The membrane electrode assembly of claim 1, wherein;
the thickness ratio of the anode catalyst layer to the anode micro-porous layer is in a range of 1:1.67 to 1:1.73,
the anode micro-porous layer includes:
a carbon-based material, and
a fluorine-based polymer,
a loading amount of the carbon-based material is in a range of 1.3 to 1.7 mg/cm$^2$, and
an amount of the fluorine-based polymer is in a range of 8 to 12 parts by weight based on 100 parts by weight of the carbon-based material.

9. The membrane electrode assembly of claim 8, wherein the thickness ratio of the anode catalyst layer to the anode diffusion support is in a range of 1:6.65 to 1:7.05.

10. The membrane electrode assembly of claim 1, wherein;
the thickness ratio of the anode catalyst layer to the anode micro-porous layer is in a range of 1:3.22 to 1:3.28,
the anode micro-porous layer includes:
a carbon-based material, and
a fluorine-based polymer,
a loading amount of the carbon-based material is in a range of 2.3 to 2.7 mg/cm$^2$, and
an amount of the fluorine-based polymer is in a range of 3 to 7 parts by weight based on 100 parts by weight of the carbon-based material.

11. The membrane electrolyte electrode assembly of claim 10, wherein the thickness ratio of the anode catalyst layer to the anode diffusion support is in a range of 1:5 to 1:5.5.

12. A fuel cell, comprising:
a membrane electrode assembly, the membrane electrode assembly including:
an electrolyte membrane, and
a cathode and an anode respectively disposed on opposing surfaces of the electrolyte membrane,
wherein the anode includes:
an anode catalyst layer, an anode micro-porous layer, and an anode diffusion support sequentially disposed on one of the opposing surfaces of the electrolyte membrane,
wherein a thickness ratio of the anode catalyst layer to the anode micro-porous layer is in a range of 1:0.82 to 1:3.28, and a thickness ratio of the anode catalyst layer to the anode diffusion support is in a range of 1:5 to 1:7.05.

* * * * *